(12) United States Patent
Chakrabarti et al.

(10) Patent No.: US 10,648,347 B2
(45) Date of Patent: May 12, 2020

(54) DAMPING INSERTS AND METHODS FOR SHROUDED TURBINE BLADES

(71) Applicant: General Electric Company, Schenectady, NY (US)

(72) Inventors: Suryarghya Chakrabarti, Niskayuna, NY (US); Brian Potter, Greenville, SC (US); Andrew Grafitti, Greenville, SC (US); James Tyson Balkcum, III, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 841 days.

(21) Appl. No.: 15/397,176

(22) Filed: Jan. 3, 2017

(65) Prior Publication Data

US 2018/0230818 A1 Aug. 16, 2018

(51) Int. Cl.
*F01D 5/22* (2006.01)
*F01D 5/30* (2006.01)
*F01D 5/10* (2006.01)

(52) U.S. Cl.
CPC ............... *F01D 5/225* (2013.01); *F01D 5/10* (2013.01); *F01D 5/3007* (2013.01); *F05D 2240/24* (2013.01); *F05D 2260/96* (2013.01)

(58) Field of Classification Search
CPC ... F01D 5/225; F01D 5/10; F01D 5/22; F01D 5/3007; F01D 5/26; F01D 25/06; F05D 2240/24; F05D 2260/96; F05B 2260/964
USPC ...................................................... 416/193 R
See application file for complete search history.

(56) References Cited

U.S. PATENT DOCUMENTS

| 3,986,792 | A | | 10/1976 | Warner | |
|---|---|---|---|---|---|
| 3,990,813 | A | * | 11/1976 | Imai | ............ F01D 5/22 416/196 R |
| 4,815,938 | A | | 3/1989 | Brown | |

(Continued)

FOREIGN PATENT DOCUMENTS

| EP | 2 213 837 A1 | 8/2010 |
|---|---|---|
| EP | 2 402 559 A1 | 1/2012 |

(Continued)

OTHER PUBLICATIONS

Extended European Search Report and Opinion issued in connection with corresponding EP Application No. 17208894.0 dated Jun. 25, 2018, 7 Pages.

*Primary Examiner* — Aaron R Eastman
(74) *Attorney, Agent, or Firm* — Philip S. Hof; The Small Patent Law Group, LLC

(57) ABSTRACT

A rotor assembly includes plural blades and damping inserts. The blades include a carrier shroud and a lid shroud extending from an airfoil of the respective blade in generally opposite directions. The carrier shrouds define pockets at distal ends thereof. The damping inserts are disposed in the pockets of the carrier shrouds of the blades and free-floating within the pockets. The damping inserts are configured to dampen vibrations of the blades during rotation of the blades and the rotor disk via engaging an interior surface within the corresponding pocket of the carrier shroud and engaging a distal end of the lid shroud of the neighboring blade. A contact force applied by each damping insert on the distal end of the lid shroud of the neighboring blade is based on a rotational speed of the blades and the rotor disk.

20 Claims, 8 Drawing Sheets

(56) References Cited

U.S. PATENT DOCUMENTS

| | | | |
|---|---|---|---|
| 4,936,749 A * | 6/1990 | Arrao | F01D 5/22 |
| | | | 416/190 |
| 5,083,903 A | 1/1992 | Erdmann | |
| 5,238,366 A * | 8/1993 | Ferleger | F01D 21/003 |
| | | | 415/118 |
| 5,369,882 A | 12/1994 | Dietz et al. | |
| 5,511,948 A | 4/1996 | Suzuki et al. | |
| 5,730,584 A * | 3/1998 | Dodd | F01D 5/22 |
| | | | 416/190 |
| 6,171,058 B1 * | 1/2001 | Stec | F01D 5/22 |
| | | | 416/193 A |
| 8,047,773 B2 | 11/2011 | Bruce et al. | |
| 8,182,228 B2 | 5/2012 | Riley et al. | |
| 8,596,980 B2 | 12/2013 | Miller | |
| 9,399,920 B2 | 7/2016 | Miller et al. | |
| 2010/0034657 A1 * | 2/2010 | Hunt | F01D 5/22 |
| | | | 416/190 |
| 2013/0052032 A1 * | 2/2013 | Fachat | F01D 5/225 |
| | | | 416/241 R |
| 2013/0121810 A1 * | 5/2013 | Alquier | F01D 11/006 |
| | | | 415/116 |
| 2014/0348657 A1 | 11/2014 | Stiehler et al. | |
| 2016/0108737 A1 * | 4/2016 | Batt | F01D 5/225 |
| | | | 416/190 |
| 2017/0067346 A1 * | 3/2017 | Kareff | F01D 5/22 |
| 2017/0067348 A1 * | 3/2017 | Kareff | F01D 5/22 |
| 2017/0067349 A1 * | 3/2017 | Kareff | F01D 5/22 |
| 2017/0067350 A1 * | 3/2017 | Kareff | F01D 5/22 |

FOREIGN PATENT DOCUMENTS

| | | |
|---|---|---|
| EP | 3 056 677 A1 | 8/2016 |
| JP | 2005-256786 A | 9/2005 |
| JP | 4087729 B2 | 5/2008 |

* cited by examiner

DAMPING INSERTS AND METHODS FOR SHROUDED TURBINE BLADES

FIELD

Embodiments of the subject matter described herein relate to damping inserts that reduce or eliminate vibrations of blades in rotor assemblies.

BACKGROUND

Rotor assemblies are used in various systems, such as gas turbine engines and turbochargers. In a gas turbine engine, pressurized air that is produced in a compression system is mixed with fuel in a combustor and ignited, generating hot combustion gases which flow through one or more turbine stages. The turbine stages extract energy from the hot combustion gases for generating engine thrust to propel a vehicle (e.g., a train, an aircraft, a marine vessel, etc.) or to power a load, such as an electrical generator.

The gas turbine includes a rotor assembly having a plurality of blades extending radially outward from a rotor disk. Each blade has a mounting segment, such as a dovetail, that engages the disc, and an airfoil extending from the mounting segment to a tip of the blade. In some rotor assemblies, the blades have at least one pair of shrouds on the airfoil. In each pair, one shroud extends from one side of the airfoil and the other shroud extends from an opposite side of the airfoil. The shrouds are located along a length of the airfoil between the tip and the mounting segment of the blade (e.g., mid- or part-span shrouds) and/or at the tip of the blade (e.g., tip shrouds). During normal operation of the compression system, the blades twist as the rotor assembly rotates and the shrouds on adjacent blades contact each other, forming a circumferentially-extending shroud ring that provides support to the blades. The shroud ring couples the blades together through friction at the shroud interfaces to dampen vibration of the blades to mitigate high cycle fatigue risk. Reducing or eliminating vibrations of the blades can extend the useful life of the turbine blades.

There are some disadvantages associated with the conventional shrouded turbine blades that provide damping through friction at the shroud interfaces. For example, in order to provide appropriate sliding and energy dissipation between the shrouds, the contact load at the interface between the shrouds of adjacent blades needs to be maintained at an appropriate level, which requires precise machining and assembly of the rotor assembly. The contact load is dependent on an initial shroud gap between shrouds of adjacent blades, amount of untwist of the blades during operation, and stiffness of the airfoils. Due to manufacturing tolerances, it may be difficult to control the contact load for effective damping over a wide operating range. Conventional shrouded turbine blades also have a potential for damage at low rotational speeds before the shrouds of adjacent blades engage each other, which is referred to as lock up. For example, to maintain a relatively low contact load between the shrouds at operating speeds, which is desirable for damping, the blades are designed with a relatively large shroud gap such that the shrouds lock up at a relatively high rotational speed. At speeds lower than the lock up speed, the adjacent blades are not connected to each other remote from the rotor disk, so the blades risk damage due to vibration, aerodynamic instability, and the like. Furthermore, the blades may experience high temperature creep over time which can significantly affect the contact load at the interface between the shrouds of adjacent blades. The creep therefore affects the amount of energy dissipated between the blades over time, which can make the blades susceptible to high vibratory stresses.

BRIEF DESCRIPTION

In an embodiment, a rotor assembly is provided that includes plural blades and damping inserts. The blades are mounted to a rotor disk and spaced apart along an outer periphery of the rotor disk. The blades have airfoils extending from the rotor disk. The blades include a carrier shroud and a lid shroud extending from the respective airfoil in generally opposite directions to respective distal ends. The carrier shrouds define pockets that extend into the carrier shrouds from openings at the distal ends thereof. The distal end of the carrier shroud is disposed at least proximate to the distal end of the lid shroud of a neighboring blade. The damping inserts are disposed in the pockets of the carrier shrouds of the blades and free-floating within the pockets. The damping inserts are configured to dampen vibrations of the blades during rotation of the blades and the rotor disk via engaging an interior surface within the corresponding pocket of the carrier shroud and engaging the distal end of the lid shroud of the neighboring blade. A contact force applied by each damping insert on the distal end of the lid shroud of the neighboring blade is based on a rotational speed of the blades and the rotor disk.

In another embodiment, a method is provided that includes forming a pocket into a carrier shroud of a blade of a rotor assembly. The pocket is formed into the carrier shroud through an opening at a distal end of the carrier shroud relative to the blade. The pocket includes an upper interior surface within the pocket that is slanted towards the opening at the distal end of the carrier shroud. The method also includes inserting a damping insert into the pocket in the carrier shroud through the opening. The damping insert is sized smaller than the pocket and free-floating within the pocket. The damping insert is inserted into the pocket to dampen vibrations of the blade and a neighboring blade of the rotor assembly during rotation of the blades. The damping insert dampens the vibrations via engaging the upper interior surface within the pocket and engaging a distal end of a lid shroud of the neighboring blade that is disposed at least proximate to the distal end of the carrier shroud of the blade. A contact force applied by the damping insert in the pocket on the distal end of the lid shroud of the neighboring blade is based on a rotational speed of the blades.

In another embodiment, a rotor assembly is provided that includes plural blades and damping inserts. The blades are mounted to a rotor disk and spaced apart along an outer periphery of the rotor disk. The blades have airfoils extending from the rotor disk. The blades include a carrier shroud and a lid shroud extending from the respective airfoil in generally opposite directions to respective distal ends. The carrier shrouds define pockets that extend into the carrier shrouds from openings at the distal ends thereof. The pockets include upper interior surfaces that are slanted at an angle towards the opening of the corresponding carrier shroud such that the upper interior surface faces at least partially towards the opening. The distal end of the carrier shroud is disposed at least proximate to the distal end of the lid shroud of a neighboring blade. The damping inserts are disposed in the pockets of the carrier shrouds of the blades and free-floating within the pockets. The damping inserts are configured to engage the upper interior surfaces within the corresponding pockets during rotation of the blades and the rotor disk to dampen vibrations of the blades. The upper interior surfaces within the pockets are slanted to, responsive to the blades and the rotor disk rotating at a rotational speed that exceeds a threshold insert engagement speed, guide the corresponding damping insert therein to move relative to the pocket towards the lid shroud of the neighboring blade from a recessed position that is spaced apart from the lid shroud of the neighboring blade to a contact position abutting the distal end of the lid shroud of the neighboring blade.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments described herein provide rotor assemblies that include damping inserts and methods for adding damping inserts to rotor assemblies. The damping inserts can be added to pre-manufactured rotor assemblies (e.g., as a retrofit) and/or the rotor assemblies can be manufactured to include the damping inserts. The damping inserts are configured to reduce vibrations of the blades of the rotor assemblies and thereby increase the useful life of the blades and rotor assemblies.

In one embodiment, a damping insert within shrouds of the blades can overcome at least some of the disadvantages of conventional shrouded turbine blades. The damping inserts can ensure contact between the shrouds of adjacent blades from lower speeds relative to the lock up speeds of conventional shrouded turbine blades. The shrouds would be connected via the damping insert at relatively low speeds, which would mitigate structural damage in case of aerodynamic instability, for example, during start up and shut down of the rotor assembly. Furthermore, the contact load between the shrouds of adjacent blades may be easier to control and less affected by material creep than conventional shrouded turbine blades. For example, the contact load depends on the mass of the damping insert, which is easier to accurately control (and less susceptible to material creep) than the dimensions of the shroud gaps between shrouds and the amount of untwist of the blades during operation. The damping inserts within the shrouds of blades may provide effective mechanical damping for the rotor assembly by dissipating energy over a relatively wide range of rotational speeds and over a long period of time. Since the shrouded blades described in one or more embodiments herein are less reliant on shroud-to-shroud contact to provide damping, the damping inserts may reduce the dependence on having blade components machined to narrow tolerances.

Figure 1:
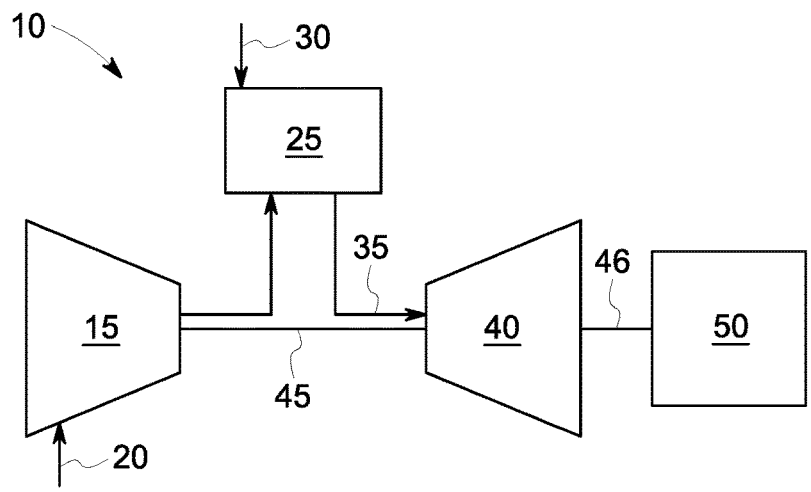
FIG. 1 shows a schematic view of a gas turbine engine system according to an embodiment which includes a compressor, a combustor, and a turbine.

FIG. 1 shows a schematic view of a gas turbine engine system 10 according to an embodiment which includes a compressor 15, a combustor 25, and a turbine 40. The compressor 15 and turbine 40 may include rows of blades that are axially stacked in stages. Each stage includes a row of circumferentially spaced blades, which are fixed, and a row of rotor blades, which rotate about one or more central shafts. In operation, the compressor rotor blades rotate about the shaft and, acting in concert with the stator blades, compress a flow of air 20. The compression system 15 delivers the compressed flow of air 20 to a combustion system 25. The combustion system 25 mixes the compressed flow of air 20 with a pressurized flow of fuel 30 and ignites the mixture to provide a flow of combustion gases 35. The flow of combustion gases 35 is in turn delivered to a turbine 40. The turbine rotor blades rotate about the shaft and, acting in concert with the stator blades, expand the combustion gases 35 through the turbine 40 so as to produce mechanical work. The mechanical work produced in the turbine 40 drives the compression system 15 via one or more shafts 45 and may drive an external load 50, such as an electrical generator or the like, via one or more shafts 46. The gas turbine engine system 10 may have different shaft, compressor, and turbine configurations and use other types of components in other embodiments. Other types of turbines may also be used.

The embodiments of the rotor assembly described herein may be used in the gas turbine engine system 10, such as on the turbine 40 or the compressor 15. However, the embodiments of the rotor assembly described herein are not limited to use in the engine system 10 shown in FIG. 1, and may be used in other devices, such as turbochargers, HVAC systems, and the like.

Figure 2:
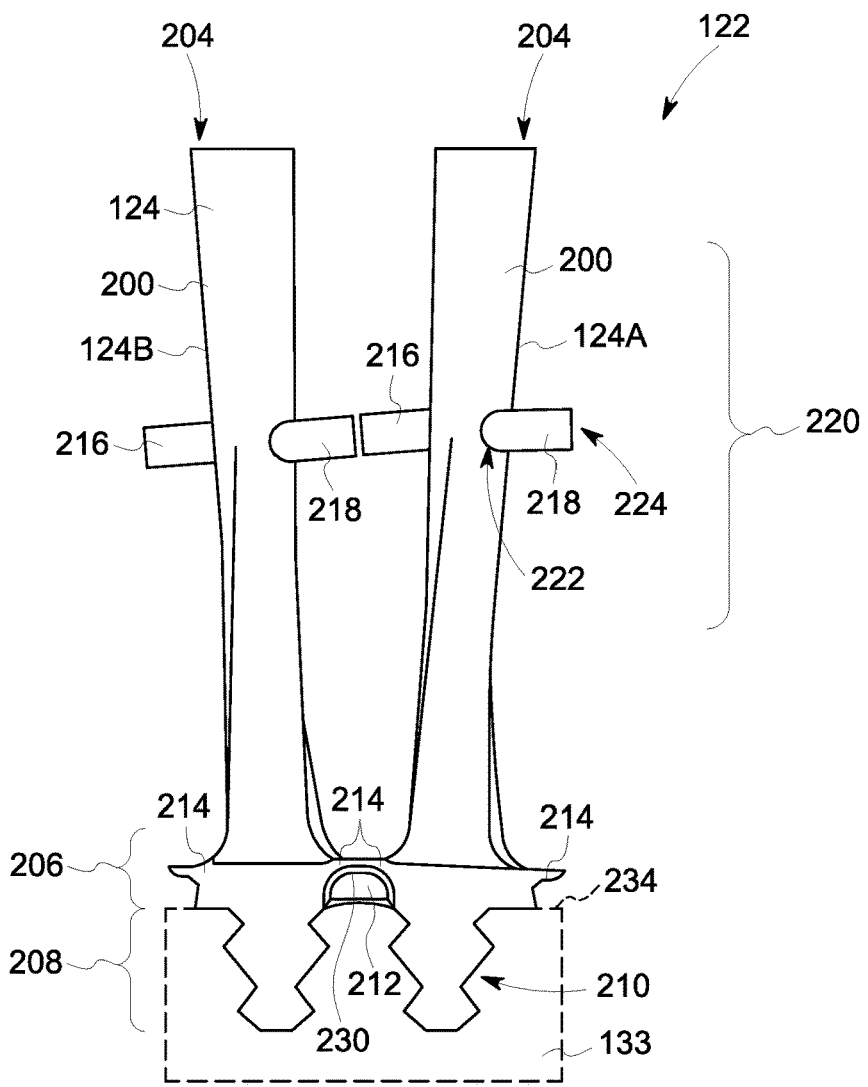
FIG. 2 illustrates a portion of a rotor disk and a pair of blades of a rotor assembly according to one embodiment.

FIG. 2 illustrates a portion of a rotor disk 133 and a pair of blades 124 of a rotor assembly 122 according to one embodiment. Although not shown, the rotor disk 133 has a curved outer periphery, and the rotor assembly 122 further includes additional blades 124 extending radially from the rotor disk 133 at spaced apart locations along the outer periphery of the rotor disk 133. The blades 124 have mounting segments 208 that mount to the rotor disk 133, airfoils 200 that extend from the rotor disk 133, and optionally also include platforms 206 disposed between the airfoil 200 and the mounting segment 208. The platforms 206 extend laterally outward from the corresponding blades 124 towards at least one neighboring (e.g., immediately adjacent) blade 124. The mounting segments 208 are received in corresponding support slots 210 of the rotor disk 133 to mount the blades 124. The mounting segments 208 may be referred to herein as dovetails 208 due to the shapes of the mounting segments 208. The support slots 210 have a complementary shape to the dovetails 208.

Figure 9:
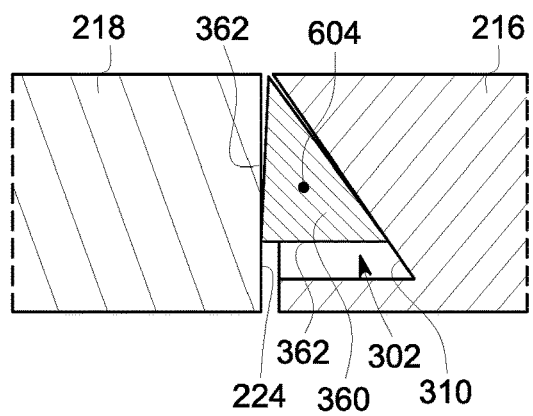
FIG. 9 illustrates a cross-sectional view of the rotor assembly according to another alternative embodiment with a triangular damping insert.

The airfoils 200 extend from the platforms 206 to distal tips 204 of the airfoils 200. The airfoils 200 receive energy from the gas (e.g., air, exhaust, or the like) flowing through the rotor assembly 122. The blades 124 have a pair of first and second shrouds 216, 218 that extend outward from the airfoil 200. The shrouds 216, 218 are located at a common location along a length of the airfoil 200 between the platform 206 and the distal tip 204. In the illustrated embodiment, the shrouds 216, 218 are mid-span shrouds that are located in a medial region 220 of the airfoil 200 that is spaced apart from the distal tip 204 and the platform 206. In an alternative embodiment, the shrouds 216, 218 may be tip shrouds that are located at the distal tips 204 of the airfoils 200. In another alternative embodiment, the blades 124 may include both mid-span shrouds and tip shrouds, as shown in FIG. 9. The first and second shrouds 216, 218 in each pair extend in generally opposite directions from the respective airfoil 200. For example, the first shroud 216 may extend from a first side (e.g., a pressure side) of the airfoil 200, and the second shroud 218 extends from an opposite second side (e.g., a suction side) of the airfoil 200. When the rotor assembly 122 is fully assembled, the shrouds 216, 218 of the blades 124 extend circumferentially and define a shroud ring that is concentric with the rotor disc 133. The shrouds 216, 218 are cantilevered, extending from attachment ends 222 connected to the airfoil 200 to distal ends 224 that are remote from the airfoil 200. The distal end 224 of the first shroud 216 of a first blade 124A is disposed at least proximate to the distal end 224 of the second shroud 218 of a neighboring, second blade 124B.

The rotor assembly 122 may optionally also include under-platform damping members 212 disposed between the rotor disk 133 and the platforms 206 of the blades 124. The under-platform damping members are configured to engage under surfaces 230 of the platforms 206. For example, the platforms 206 may include laterally-extending shoulders 214 that define the under surfaces 230. The under-platform damping members 212 may be sandwiched between the under surfaces 230 of the two blades 124A, 124B, from above, and an outer peripheral surface 232 of the rotor disc 133, from below. The under-platform damping members 212 can help reduce the dependence on dovetail fits between dovetails 208 of the blades 124 and the support slots 210 in the rotor disk 133 and provide significant reduction in blade vibrations.

In operation, the under-platform damping members 212 may sit under the platforms 206 of adjacent blades 124 and load up against the under surfaces 230 due to centrifugal loading as the rotor assembly 122 rotates. Energy is dissipated via rubbing between the platforms 206 and damping members 212, and this dissipation reduces or eliminates vibration of the blades 124. Additionally, the under-platform damping member 212 shown in FIG. 2 engages the platforms 206 of both adjacent blades 124A, 124B, which may reduce relative movements or vibrations between the adjacent blades 124A, 124B. It is recognized that the under-platform damping members 212 described herein are optional components of the rotor assembly 122.

Figure 3:
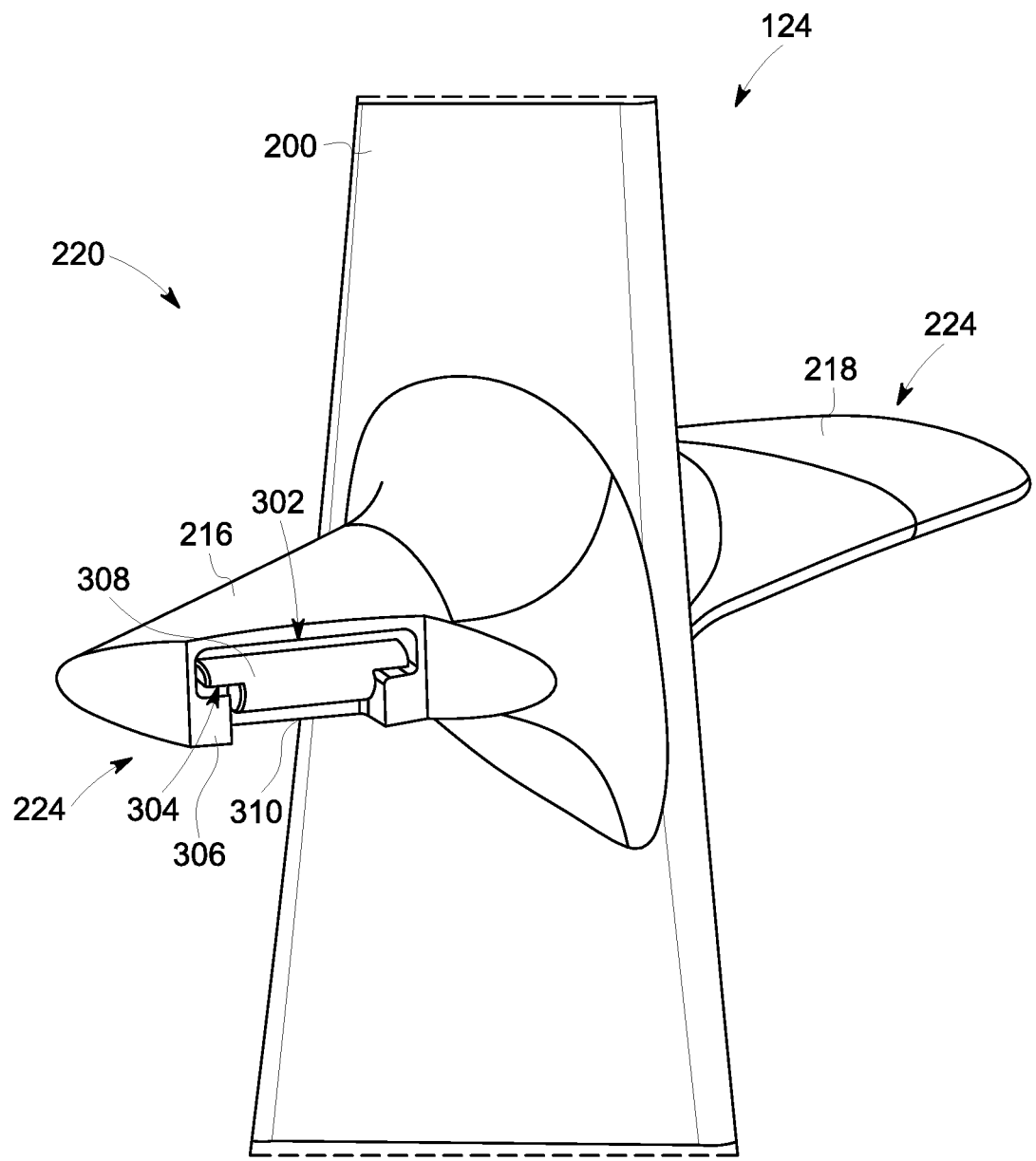
FIG. 3 is a perspective view of a portion of one of the blades of the rotor assembly according to an embodiment.

FIG. 3 is a perspective view of a portion of one of the blades 124 of the rotor assembly 122 (shown in FIG. 2) according to an embodiment. The illustrated portion of the blade 124 shows the medial region 220 of the airfoil 200 including the first and second shrouds 216, 218. In an embodiment, the first shroud 216 defines a recess or pocket 302 within the shroud 216. The pocket 302 is open at the distal end 224 of the shroud 216. For example, the pocket 302 extends a depth into the shroud 216 from an opening 304 defined along an edge surface 306 of the shroud 216 at the distal end 224. The first shroud 216 is configured to carry a damping insert 308 within the pocket 302. Therefore, the first shroud 216 is referred to herein as a carrier shroud 216.

The damping insert 308 is free-floating within the pocket 302, such that the damping insert 308 is not fixedly attached to any interior surfaces within the pocket 302. The pocket 302 is sized at least partially larger than the damping insert 308, which allows the damping insert 308 to move within the pocket 302. The damping insert 308 may be an elongated pin. The damping insert 308 may be generally cylindrical, or have other shapes with curved surfaces. In one or more alternative embodiments, the damping insert 308 may have a prism shape, such as a triangular prism, a cuboid, or the like, with planar surfaces. The damping insert 308 can be formed of a resilient material that absorbs kinetic or vibrational energy of the blades 124.

In an embodiment, the damping insert 308 is loaded into the pocket 302 through the opening 304 at the distal end 224 of the carrier shroud 216. The damping insert 308 is retained within the pocket 302 during operation of the rotor assembly 122 (shown in FIG. 2) via the distal end 224 of the second shroud 218 of a neighboring blade 124. The distal end 224 of the second shroud 218 blocks the damping insert 308 from exiting the pocket 302. The second shroud 218 is referred to herein as a lid shroud 218 because the distal end 224 of the second shroud 218 acts as a lid or cover for the pocket 302 of the neighboring carrier shroud 216. During assembly of the rotor assembly 122, the damping insert 308 is loaded into the pocket 302 of the carrier shroud 216 of a first blade 124, and the blade 124 is mounted to the rotor disk 133 (shown in FIG. 2). Then, a second blade 124 is mounted to the rotor disk 133 next to the first blade 124 such that the lid shroud 218 of the second blade 124 blocks the damping insert 308 of the first blade 124 from falling out of the pocket 302 through the opening 304. Alternatively, the second blade 124 may be mounted to the rotor disk 133 before the first blade 124. In such an embodiment, the damping insert 308 is loaded into the pocket 302 of the first blade 124 prior to mounting the first blade 124 to the rotor disk 133, allowing the damping insert 308 to be captured between the carrier shroud 216 of the first blade 124 and the lid shroud 218 of the second blade 124.

The damping inserts 308 in the pockets 302 of the carrier shrouds 216 are configured to dampen vibrations of the blades 124 during operation of the rotor assembly 122. For example, as the rotor assembly 122 rotates, the free-floating damping insert 308 is pushed upwards into engagement with an upper interior surface 310 of the pocket 302 due to centrifugal loading as the rotor assembly 122 rotates. As the respective blade 124 holding the damping insert 308 vibrates, energy is dissipated via rubbing between the upper interior surface 310 and the damping insert 308. The energy dissipation reduces or eliminates vibration of the blade 124. In addition, the damping insert 308 is configured to engage the distal end 224 of the lid shroud 218 of the neighboring blade 124 as the rotor assembly 122 (shown in FIG. 2) rotates. The rubbing between the lid shroud 218 and the damping insert 308 provides a mechanical connection between the blades 124, reducing blade-to-blade movements, and also provides additional energy dissipation.

The distal end 224 of the lid shroud 218 may have a planar surface that faces the opening 304 of the pocket 302 of the adjacent carrier shroud 216 and engages the damping insert 308. Alternatively, the lid shroud 218 may define a cavity or depression at the distal end 224. The damping insert 308 may be configured to move into the cavity of the lid shroud 218 (without completely exiting the pocket 302 of the carrier shroud 216), such that the damping insert 308 simultaneously extends from the pocket 302 into the cavity of the lid shroud 218. The damping insert 308 engages (e.g., abuts and rubs against) interior surfaces within the cavity to provide energy dissipation between the blades 124.

Figure 4:
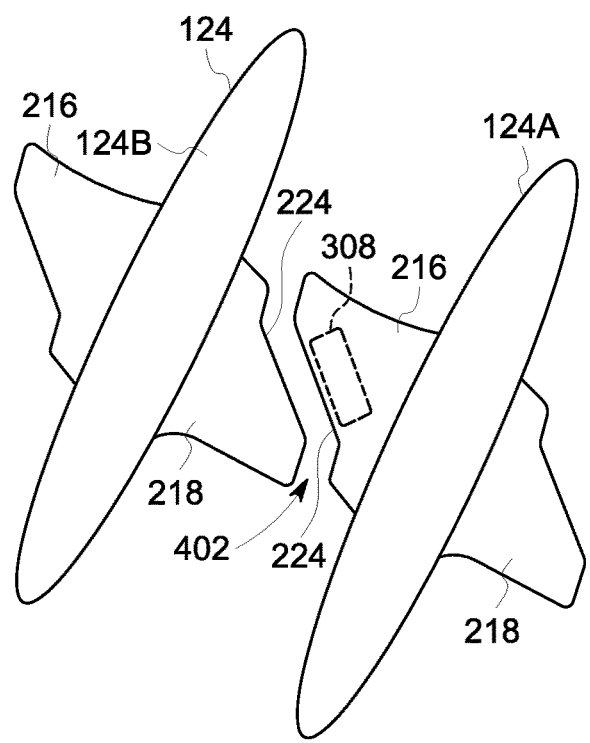
FIG. 4 illustrates a top-down view of two adjacent blades in a non-operating state of the rotor assembly according to an embodiment.
Figure 5:
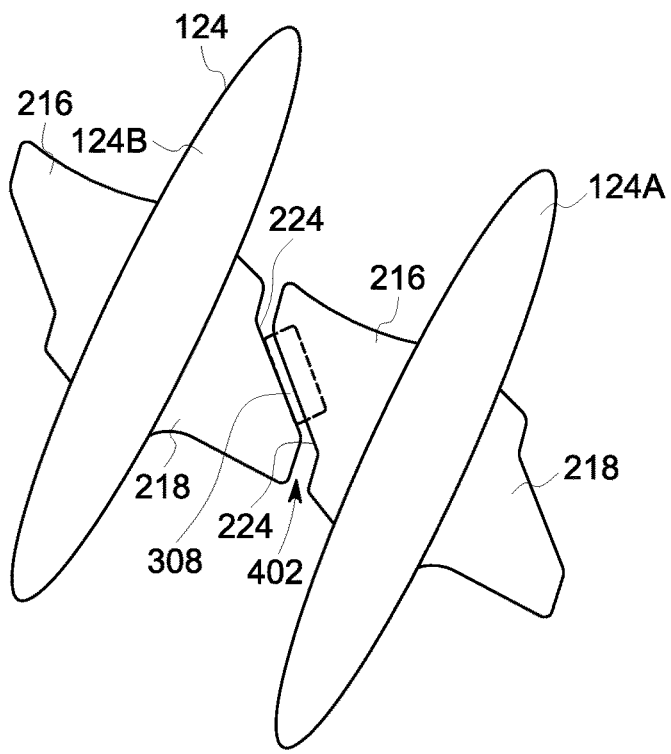
FIG. 5 illustrates a top-down view of the two adjacent blades in an operating state of the rotor assembly according to an embodiment.

FIGS. 4 and 5 illustrate top-down views of two adjacent blades 124 of the rotor assembly 122 (shown in FIG. 2) according to an embodiment. FIG. 4 shows the blades 124 in a non-operating state of the rotor assembly 122, when the blades 124 and rotor disk 133 (shown in FIG. 2) are not rotating. FIG. 5 shows the blades 124 in an operating state of the rotor assembly 122, such that the blades 124 and rotor disk 133 are actively rotating. FIGS. 4 and 5 show the damping insert 308 that is within the carrier shroud 216 of the first blade 124A, but do not illustrate the damping insert 308 within the carrier shroud 216 of the second blade 124B. The portions of the damping insert 308 obstructed by the carrier shroud 216 are illustrated in phantom.

In an embodiment, the blades 124 are configured to twist based on the rotational speed of the rotor assembly 122 (shown in FIG. 2). For example, in the non-operating state shown in FIG. 4, the distal end 224 of the carrier shroud 216 of the first blade 124A is separated from the distal end 224 of the lid shroud 218 of the second blade 124B by a shroud gap 402. The size of the shroud gap 402 may be exaggerated in the illustrated embodiments for descriptive purposes. As the rotor assembly 122 speeds up during operation, the blades 124 twist such that the carrier shroud 216 of the first blade 124A moves towards the lid shroud 218 of the second blade 124B and vice-versa. As a result, the size of the shroud gap 402 between the opposing distal ends 224 decreases. In one embodiment, at an operating speed of the rotor assembly 122, the opposing distal ends 224 of the shrouds 216, 218 are configured to engage each other, reducing the shroud gap 402 to zero. The operating speed represents the rotational speed or range of speeds of the rotor assembly 122 when the rotor assembly 122 is fully operational, and therefore is not starting up or slowing down. The shroud gap 402 is present in FIG. 5, although reduced relative to the size of the gap 402 in FIG. 4. Therefore, FIG. 5 may depict the orientation of the blades 124A, 124B at an intermediate speed that is 40%, 60%, or 80% of the operating speed of the rotor assembly 122. In an alternative embodiment, the opposing distal ends 224 of the shrouds 216, 218 of the two blades 124A, 124B do not engage each other at the operating speed. In this alternative embodiment, FIG. 5 may depict the orientation of the blades 124A, 124B at the operating speed of the rotor assembly 122.

The damping insert 308 in the carrier shroud 216 of the first blade 124A is in a recessed position within the pocket 302 (shown in FIG. 3) when the rotor assembly 122 (FIG. 2) is in the non-operating state shown in FIG. 4. In the recessed position, the damping insert 308 is spaced apart from the lid shroud 218 of the neighboring blade 124B such that the damping insert 308 does not engage the lid shroud 218. Therefore, the first and second blades 124A, 124B are not mechanically connected. In an embodiment, the pocket 302 of the carrier shroud 216 is shaped to passively guide the damping insert 308 relative to the pocket 302 towards the lid shroud 218 in response to the rotational speed of the rotor assembly 122 exceeding a threshold rotational speed, referred to herein as a threshold insert engagement speed. The threshold insert engagement speed, at which the damping insert 308 moves relative to the pocket 302 to engage the neighboring lid shroud 218, may depend on various factors including the mass of the damping insert 308, the shape of the pocket 302 (e.g., the angle of the upper interior surface 310 relative to the opening 304), and the like. The threshold insert engagement speed may be at a relatively low speed, such as less than or equal to 50 rpm. As the centrifugal force exerted on the damping member 308 increases due to the rotational speed exceeding the threshold insert engagement speed, the damping insert 308 is guided from the recessed position at least partially into the shroud gap 402 to a contact position that is shown in FIG. 5. The damping insert 308 may protrude through the opening 304 into the shroud gap 402. At the contact position, the damping insert 308 abuts the distal end 224 of the lid shroud 218 of the blade 124B, providing a blade-to-blade mechanical connection and dissipating vibrational energy from the blades 124A, 124B. Therefore, the damping inserts 308 provide blade-to-blade engagement and dissipation of vibrational energy between blades 124 at a relatively large speed range starting at the relatively slow threshold insert engagement speed.

In embodiments in which the distal ends 224 of the opposing shrouds 216, 218 are configured to engage each other at the operating speed, FIG. 5 shows that the damping insert 308 in the carrier shroud 216 is configured to engage the lid shroud 218 of the neighboring blade 124B at a threshold insert engagement speed that is lower than the lock up speed at which the distal end 224 of the carrier shroud 216 engages the lid shroud 218. Whereas conventional shrouded turbine blades only provide mechanical shroud-to-shroud support and vibration dampening at speeds beyond the lock up speed, the damping insert 308 is able to dampen vibrations and provide shroud-to-shroud support at speeds below the lock up speed, reducing the risk of damage to the blades 124. In embodiments in which the distal ends 224 of the opposing shrouds 216, 218 do not engage each other at the operating speed, the damping and shroud-to-shroud support provided by the damping insert 308 as shown in FIG. 5 allows for more relaxed manufacturing tolerances of the blades 124. For example, since the shrouds 216, 218 of adjacent blades 124 do not engage one another, the manufacturing tolerances regarding the shape and stiffness of the blades 124, the relative positioning of the blades 124 in the rotor disk 133 (shown in FIG. 2), and the amount of twist of the blades 124 do not affect the contact load between the shrouds 216, 218. The damping insert 308 reduces the dependence on having the shrouds 216, 218 machined to close tolerances. The reduced emphasis on precise manufacturing tolerances may allow for cost savings associated with increased manufacturing output and/or efficiency.

Since the damping insert 308 is free-floating and passively guided by the shape of the pocket 302 (shown in FIG. 3) towards the lid shroud 218 of the neighboring blade 124B, the contact load or force exerted by the damping insert 308 on the distal end 224 of the lid shroud 218 is based on the rotational speed of the rotor assembly 122 (shown in FIG. 2), the mass of the damping insert 308, and the geometry of the pocket 302 (e.g., the angle of the upper interior surface 310 relative to the opening 304). For example, the contact force may be proportional to the square of the rotational speed such that the force exerted by the damping insert 308 on the lid shroud 218 increases with increasing rotational speed due to increasing centrifugal loading. The contact force of the damping insert 308 on the lid shroud 218 is also dependent on the mass of the damping insert 308. For example, a heavier damping insert 308 would exert a greater contact force on the lid shroud 218 than a lighter damping insert 308 due to the increased inertia of the heavier insert 308 relative to the lighter insert 308. In one or more embodiments, the damping inserts 308 are replaceable and substitutable within the pockets 302 of the carrier shroud 216 in order to select the mass of the damping inserts 308. Selecting the mass of the inserts 308 allows for control of the contact loads between the damping inserts 308 and the surfaces of the shrouds 216, 218 engaged by the inserts 308 as the rotor assembly 122 operates.

Figure 6:
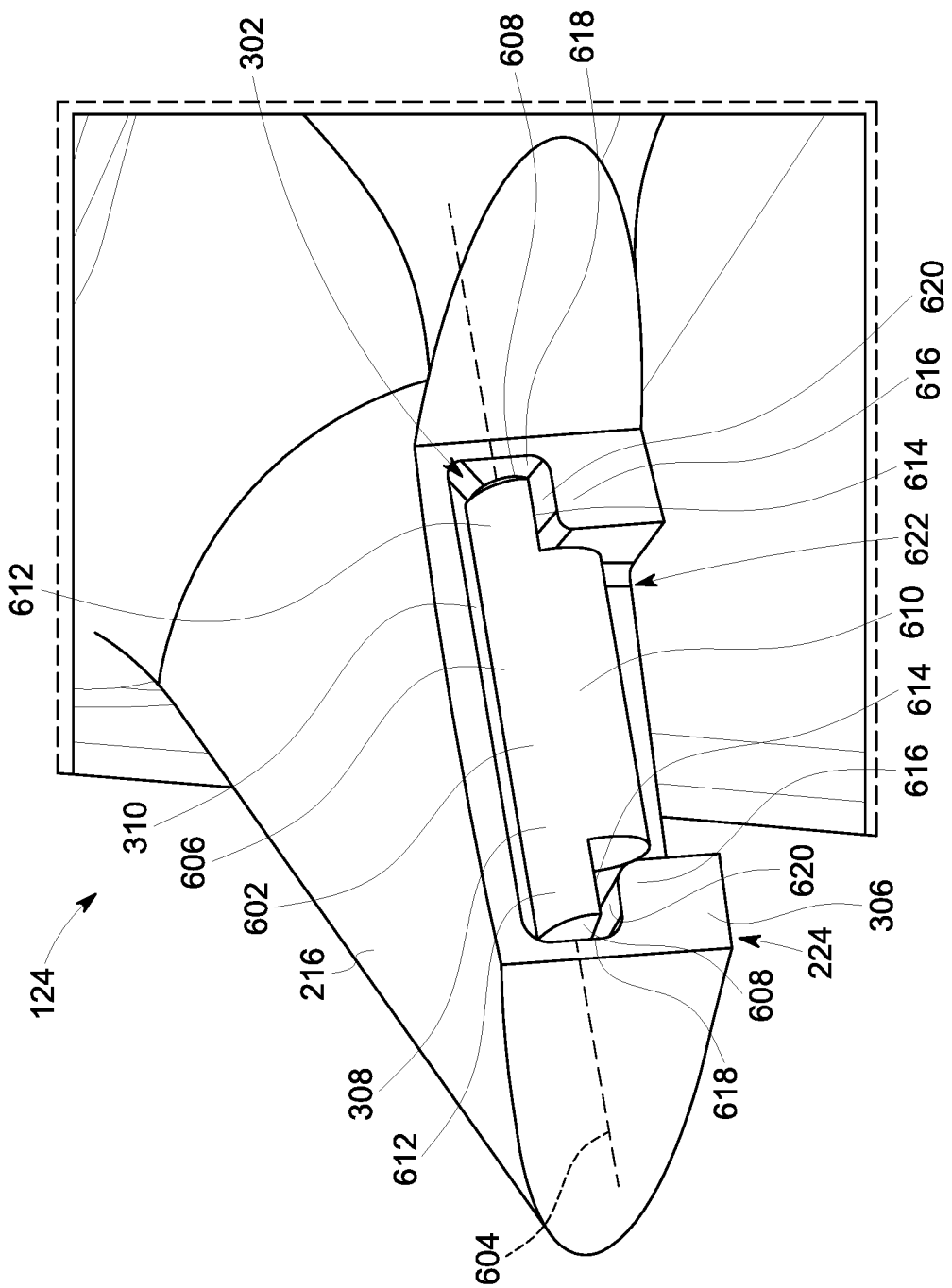
FIG. 6 is a perspective view of the carrier shroud of one of the blades of the rotor assembly according to an embodiment.
Figure 7:
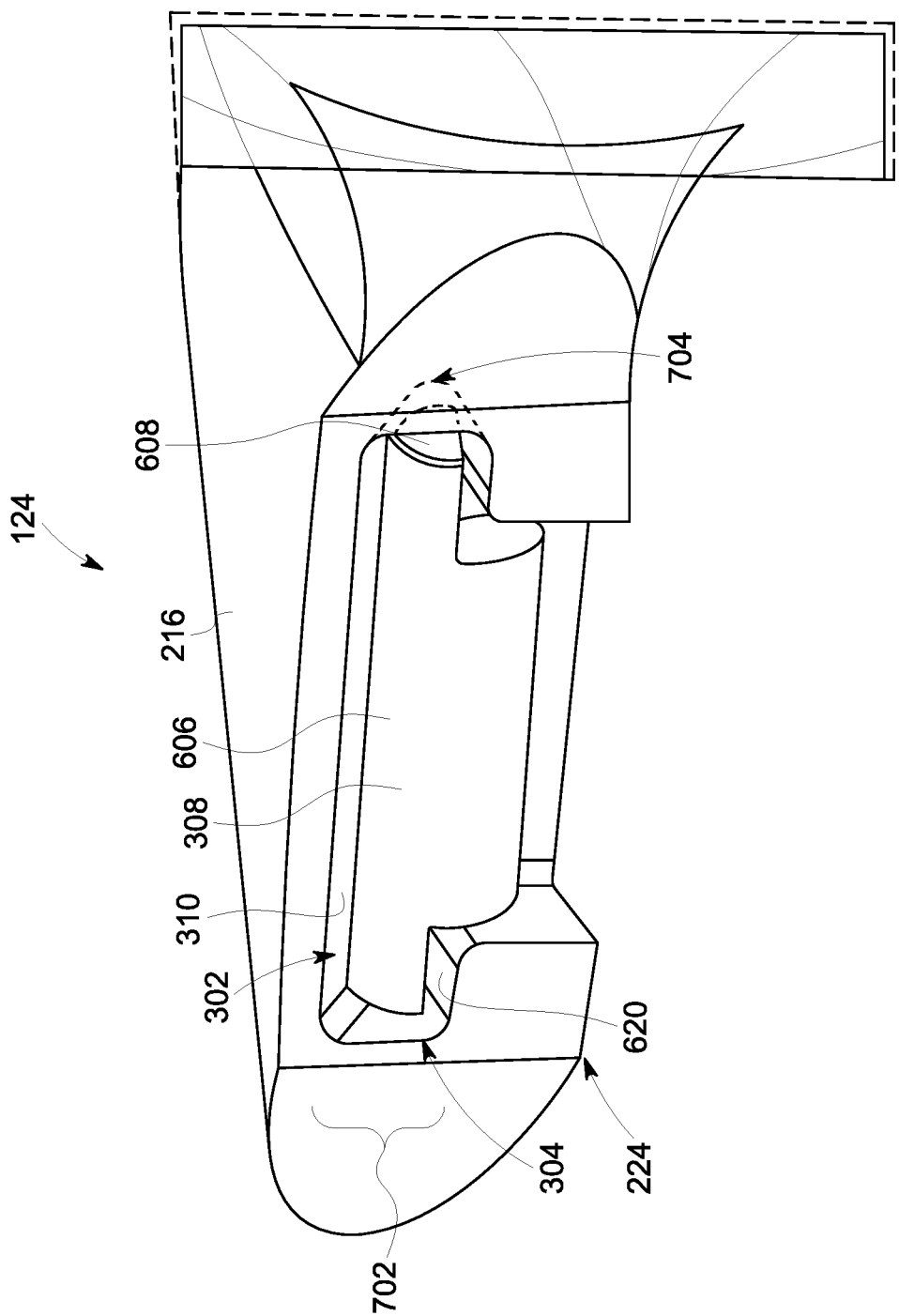
FIG. 7 is another perspective view of the carrier shroud of FIG. 6.

FIG. 6 is a perspective view of the carrier shroud 216 of one of the blades 124 of the rotor assembly 122 (shown in FIG. 2) according to one embodiment. FIG. 7 is another perspective view of the carrier shroud 216 of FIG. 6. Referring first to FIG. 6, the damping insert 308 has a pin-shaped body 602 that is elongated along a central axis 604 between two ends 608. The pin-shaped body 602 has a curved outer surface 606. For example, the body 602 may be cylindrical or at least partially cylindrical. The damping insert 308 is held in the pocket 302 of the carrier shroud 216 such that the central axis 604 of the body 602 is generally parallel to the edge surface 306 at the distal end 224 of the carrier shroud 216. For example, the pocket 302 is elongated along the edge surface 306 to accommodate the elongated damping insert 308. The damping insert 308 is shown in the recessed position within the pocket 302. In an embodiment, when the rotor assembly 122 speeds up and the pocket 302 guides the damping insert 308 towards the contact position in engagement with the lid shroud 218 (shown in FIG. 5) of the neighboring blade 124, the damping insert 308 moves relative to the carrier shroud 216 in a direction that is generally perpendicular to the central axis 604.

In an embodiment, the body 602 of the damping insert 308 is designed to prevent 360 degree rotation about the central axis 604 within the pocket 302. For example, the body 602 includes a main or center portion 610 and two ears 612 extending from the main portion 610 to a different one of the two ends 608. The central portion 610 is disposed between the two ears 612 along the central axis 604. The ears 612 each have a respective interface surface 614 that is at least generally planar. The interface surfaces 614 of the two ears 612 face in the same direction. The body 602 may be formed via a mold in the shape of the illustrated body 602, or by forming a fully cylindrical pin and subsequently removing portions of the material at the ends 608 to define the ears 612. The pocket 302 of the carrier shroud 216 in the illustrated embodiment includes two shoulders 616 at opposite lateral ends 618 of the pocket 302. The shoulders 616 define a lower interior surface 620 of the pocket 302 that is opposite the upper interior surface 310. The two shoulders 616 are spaced apart from each other by a cavity 622. When the damping insert 308 is disposed in the pocket 302, the interface surfaces 614 of the ears 612 engage the surfaces 620 of the shoulders 616, and the main portion 610 extends into the cavity 622. The engagement between the ears 612 and the shoulders 616 prevents the damping insert 308 from rotating 360 degrees about the central axis 604, allowing the damping insert 308 to dissipate more energy than if the damping insert 308 was allowed to spin about the axis 604. Furthermore, the lateral ends 618 and/or the shoulders 616 of the pocket 302 provide a track that assists in guiding the damping insert 308 towards the neighboring lid shroud 218 (shown in FIG. 5).

In the view of the carrier shroud 216 shown in FIG. 7, a portion of the pocket 302 and a portion of one of the ends 608 of the damping insert 308 are shown in phantom to illustrate the shape and depth of the pocket 302 relative to the size and shape of the damping insert 308. For example, in an embodiment, the upper interior surface 310 of the pocket 302 is slanted towards the opening 304 of the pocket 302 at the distal end 224 of the shroud 216. The upper interior surface 310 is slanted such that the surface 310 faces at least partially towards the opening 304. The slanted upper interior surface 310 is generally planar with a linear slope in the illustrated embodiment (as shown in phantom), but the surface 310 in an alternative embodiment may be more curved with a varying slope.

The upper interior surface 310 is slanted towards the opening 304 in order to guide the damping insert 308 towards the opening 304 when the damping insert 308 abuts against the upper interior surface 310 due to centrifugal loading. For example, the curved outer surface 606 of the damping insert 308 loads against the upper interior surface 310. As the rotational speed of the rotor assembly 122 (shown in FIG. 2) increases, the contact force between the damping insert 308 and the upper interior surface 310 increases and the outer surface 606 of the insert 308 slides along the slanted upper interior surface 310 towards the opening 304 (due to the centrifugal force caused by the rotation). The rotational speed of the rotor assembly 122 affects the contact force, and therefore the energy dissipation, between the damping insert 308 and the carrier shroud 216. Due to the slanted upper interior surface 310 which guides the damping insert 308 into engagement with the neighboring lid shroud 218 (shown in FIG. 5), the rotational speed of the rotor assembly 122 also affects the contact force and energy dissipation between the damping insert 308 and the lid shroud 218. The mass of the damping insert 308 is another factor that affects the contact forces and energy dissipation.

The pocket 302 extends a height 702 between the upper interior surface 310 and the lower interior surface 620. In the illustrated embodiment, the upper interior surface 310 is angled relative to the lower interior surface 620 such that the height 702 of the pocket 302 decreases with increasing depth from the opening 304 into the carrier shroud 216 to an innermost end 704 of the pocket 302. The pocket 302 is sized at least slightly larger than the damping insert 308 at the opening 304 of the pocket 302, such that one or more clearance gaps are formed that allow the damping insert 308 to move relative to the shroud 216.

Figure 8:
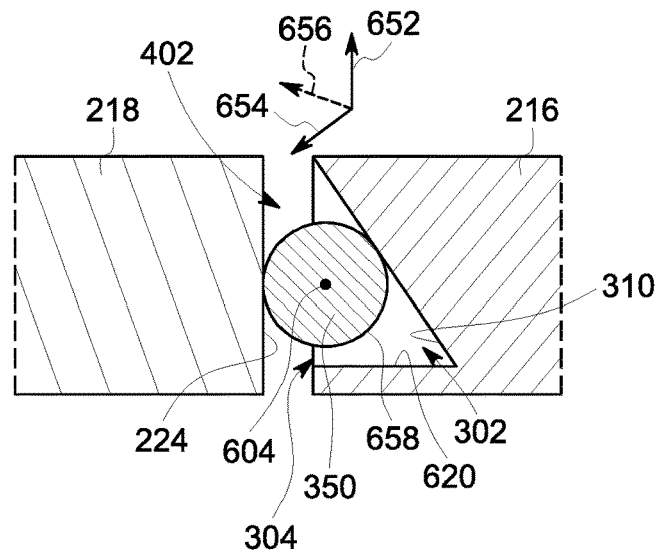
FIG. 8 illustrates a cross-sectional view of the rotor assembly according to an alternative embodiment with a cylindrical damping insert.
Figure 10:
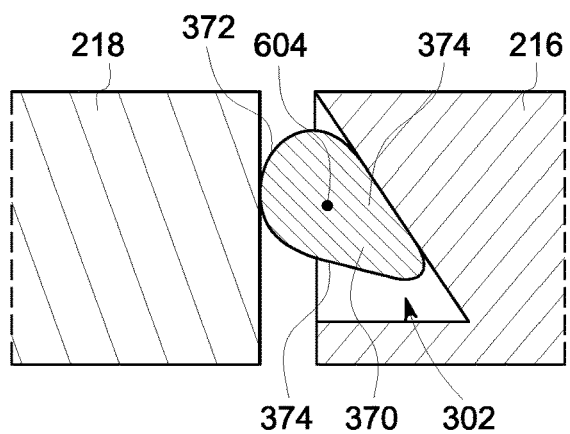
FIG. 10 illustrates a cross-sectional view of the rotor assembly according to another alternative embodiment with a hybrid damping insert having both curved and planar outer surfaces.

FIGS. 8-10 illustrate cross-sectional views of the rotor assembly 122 according to alternative embodiments that have differently-shaped shroud damping inserts located between the carrier shroud 216 and the lid shroud 218. FIG. 8 shows a cylindrical damping insert 350, FIG. 9 shows a triangular damping insert 360, and FIG. 10 shows a hybrid damping insert 370 having both curved and planar outer surfaces. The damping inserts 350, 360, 370 shown in FIGS. 8-10 may be substituted for the damping insert 308 shown in FIGS. 6 and 7. Like the damping insert 308, the damping inserts 350, 360, 370 may be elongated along a central axis 604. The cross-sectional views show the cross-sectional shapes of the damping inserts 350, 360, 370, but not the lengths of the damping inserts 350, 360, 370 along the respective central axes 604.

As described above with reference to FIG. 5, the upper interior surface 310 of the pocket 302 is slanted (e.g., angled) relative to the opening 304 to guide the damping insert 350 from the recessed position within the pocket 302 at least partially into the shroud gap 402 to the contact position abutting the distal end 224 of the lid shroud 218. The damping inserts 350, 360, 370 in FIGS. 8-10 are all shown in the contact position. As shown in FIG. 8, the centrifugal force exerts a force on the damping insert 350 in a first direction 652, and the upper interior surface 310 exerts a normal force on the damping insert 350 in a second direction 654. The combination of forces causes the damping insert 350 to move in a resultant direction 656 into the shroud gap 402 towards the lid shroud 218.

The damping insert 350 shown in FIG. 8 is cylindrical with a circular cross-sectional shape. The damping insert 350 has a curved outer surface 658 along the outer periphery of the damping insert 350. The curved outer surface 658 may spin or roll (about the axis 604) and/or slide along the upper interior surface 310 and/or the distal end 224 of the lid shroud 218 as the damping insert 350 moves relative to the pocket 302. The damping insert 360 shown in FIG. 9 is a triangular prism having a triangular cross-sectional shape. The damping insert 360 has three planar outer surfaces 362 along the outer periphery of the insert 360. The planar surfaces 362 may slide along the upper interior surface 310 and/or the distal end 224 of the lid shroud 218 without allowing the insert 360 to spin or roll. Although a triangular prism is shown, the damping insert in other embodiments may be a prism with more than three planar sides, such as a rectangular prism. The damping insert 370 shown in FIG. 10 is a hybrid that has both curved outer surfaces 372 and planar outer surfaces 374. Other shapes of damping inserts (as well as other shapes of pockets 302 of the shrouds) may be installed in the pockets 302 of the shrouds 216 in other embodiments.

In one or more embodiments, the rotor assembly 122 (shown in FIG. 2) may include both the damping inserts 308 in the carrier shrouds 216 of the blades 124 and the under-platform damping members 212 (FIG. 2). In an alternative embodiment, the rotor assembly 122 includes the damping inserts 308 but not the under-platform damping members 212.

Figure 11:
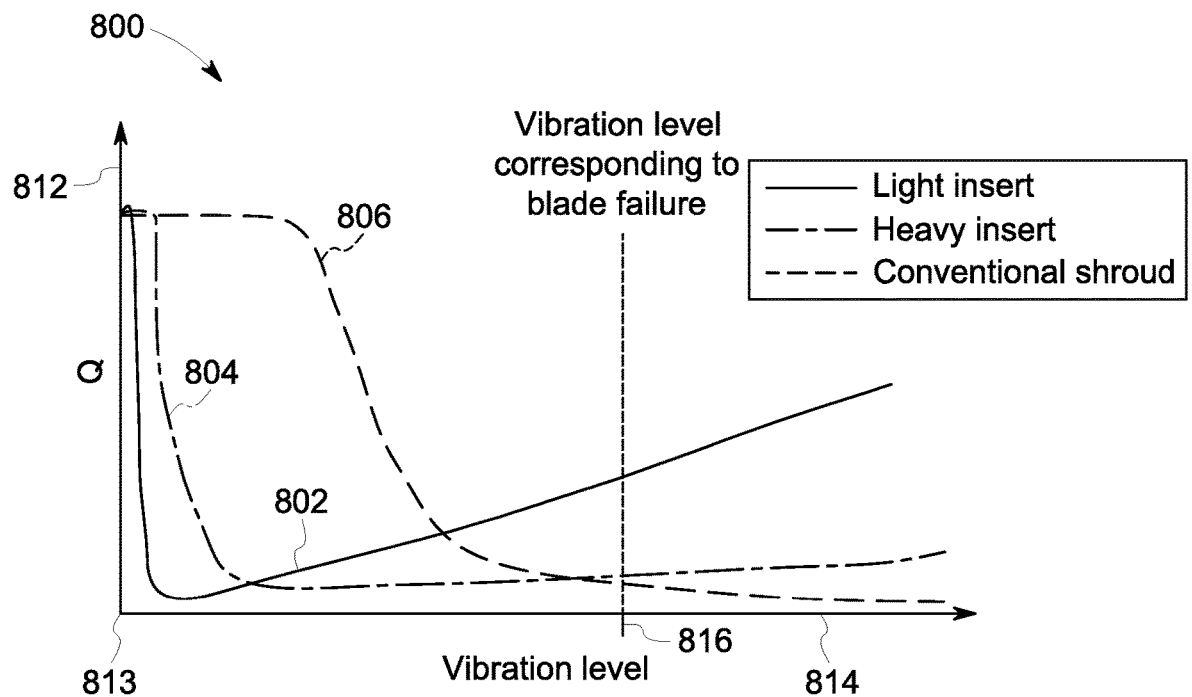
FIG. 11 is a graph illustrating a comparison of the damping effectiveness of multiple different shrouded turbine blades.

FIG. 11 is a graph 800 illustrating a comparison of the damping effectiveness of multiple different shrouded turbine blades. The y-axis 812 represents Q values, which is the inverse of damping. The Q value increases with increasing distance from the origin 813. A low Q value represents good damping effectiveness and is desired. The x-axis 814 represents vibration level of the respective blade. The extent or amount of vibration increases along the x-axis 814 with increasing distance from the origin 813. The three plot lines 802, 804, and 806 represent shrouded turbine blades. For example, the first line 802 represents a shrouded blade that includes a light shroud damping insert, and the second line 804 represents a shrouded blade that includes a heavy shroud damping insert. The damping inserts are referred to as light and heavy relative to each other, such that the damping insert used in the shrouded blade associated with the second plot line 804 is heavier (e.g., has a greater mass) than the damping insert used in the shrouded blade associated with the first plot line 802. The third line 806 represents a conventional shrouded blade that lacks a shroud damping insert. Therefore, the rotor assembly represented by the third line 806 relies on shroud-to-shroud direct engagement without the use of the shrouded damping inserts described herein.

As shown in the graph 800, the first two plot lines 802, 804 have low Q levels at low vibration levels, which means that both the light and heavy shroud damping inserts provide effective damping at low vibrations and low speeds. The third line 806 representing the conventional blades without shroud damping inserts has a higher Q level along lower vibration levels, which indicates ineffective damping. The third line 806 does not achieve effective damping (represented by a low Q level) until greater vibration levels. This poor damping at low vibrations shown by the conventional shrouded blades may be attributable to high contact loads between the adjacent shrouds of neighboring blades. The lack of damping can result in damage to the blades. Both the light damping insert and the heavy damping insert exhibit effective damping performance at vibration levels up to a vibration level 816 corresponding to a high risk of blade failure (e.g., damage). As shown in FIG. 8, the heavy damping insert 804 exhibits slightly better damping performance than the light damping insert 802 at higher vibration levels proximate to the blade failure level 816 (because the Q level for 804 is lower than the Q level for 802). Both the light and heavy damping inserts (e.g., plot lines 802, 804) exhibit more effective damping over the total vibration range from the origin 813 to the blade failure level 816 than the conventional shrouded blades (e.g., plot line 806). For example, the conventional shrouded blades only showed effective damping at relatively high vibration levels.

Figure 12:
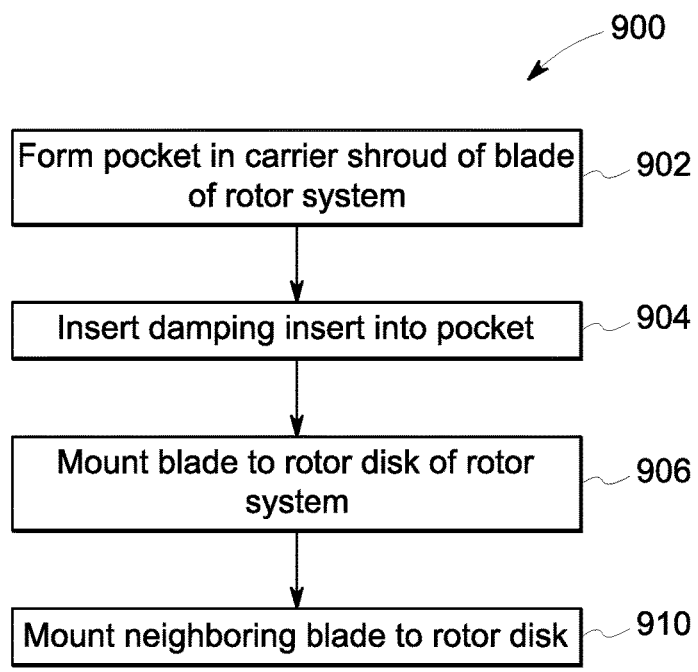
FIG. 12 illustrates a flow chart of a method for providing a rotor assembly with damping inserts according to one embodiment.

FIG. 12 illustrates a flow chart of a method 900 for providing a rotor assembly with damping inserts according to one embodiment. The method 900 may be used to manufacture a rotor assembly and/or retrofit a rotor assembly to include one or more embodiments of the shroud damping inserts described herein. The rotor assembly may be installed within a gas turbine engine, a turbocharger, or other devices. At 902, a pocket is formed into a carrier shroud of a blade of the rotor assembly. The pocket is formed into the carrier shroud through an opening at a distal end of the carrier shroud relative to the blade. In one embodiment, the blade of an existing rotor assembly may be obtained, such as by removing the blade from a rotor disk of the rotor assembly. The pocket may then be cut into the distal end of the carrier shroud of the blade as a retrofit process. Alternatively, the blade may be created to include the pocket. For example, the blade may be cast from a mold that has a shape to cause one of the shrouds to include the pocket when removed from the mold. In another example, the blade may be cast and then subsequently machined to form the pocket in the blade. In still other examples, the blade may be formed by 3D printing, forging, or the like, to include the pocket.

In an embodiment, the pocket includes an upper interior surface that is slanted towards the opening at the distal end of the carrier shroud. In response to the rotor assembly rotating greater than a threshold insert engagement speed, the upper interior surface is configured to guide a damping insert within the pocket to move relative to the pocket towards and at least partially through the opening to abut a lid shroud of a neighboring blade in the rotor assembly.

At 904, a damping insert is inserted into the pocket in the carrier shroud through the opening. The damping insert is smaller than the pocket and is free-floating within the pocket. The damping insert is configured to dampen vibrations of the blade and the neighboring blade of the rotor system during rotation of the rotor assembly. In an embodiment, the damping insert has a pin-shaped body that is elongated along a central axis. The damping insert is oriented within the pocket such that the central axis is generally parallel to an edge surface at the distal end of the carrier shroud. The opening to the pocket is defined along the edge surface.

At 906, the blade is mounted to the rotor disk of the rotor assembly such that the blade extends radially from an outer periphery of the rotor disk. For example, a mounting segment of the blade may be axially slid into support slots of the rotor disk along a direction that is parallel to an axis of rotation of the rotor disk. In one embodiment, the damping insert is loaded into the pocket of the carrier shroud of the blade before the blade is mounted to the rotor disk. In an alternative embodiment, the blade is mounted to the rotor disk and then the damping insert is loaded into the pocket of the carrier shroud.

At 908, the neighboring blade is mounted to the rotor disk. A shroud (e.g., a lid shroud) of the neighboring blade blocks the damping insert from exiting the pocket of the blade during rotation of the rotor assembly. In an embodiment, the blade with the damping insert is mounted to the rotor disk before the neighboring blade, but, in an alternative embodiment, the blade is mounted after the neighboring blade. The damping insert is configured to dampen vibrations of the blade by engaging the upper interior surface within the pocket. The damping insert is also configured to dampen vibrations of the neighboring blade by engaging a distal end of the lid shroud of the neighboring blade. A contact force applied by the damping insert in the pocket on the distal end of the lid shroud of the neighboring blade is based on a rotational speed of the rotor assembly.

Figure 13:
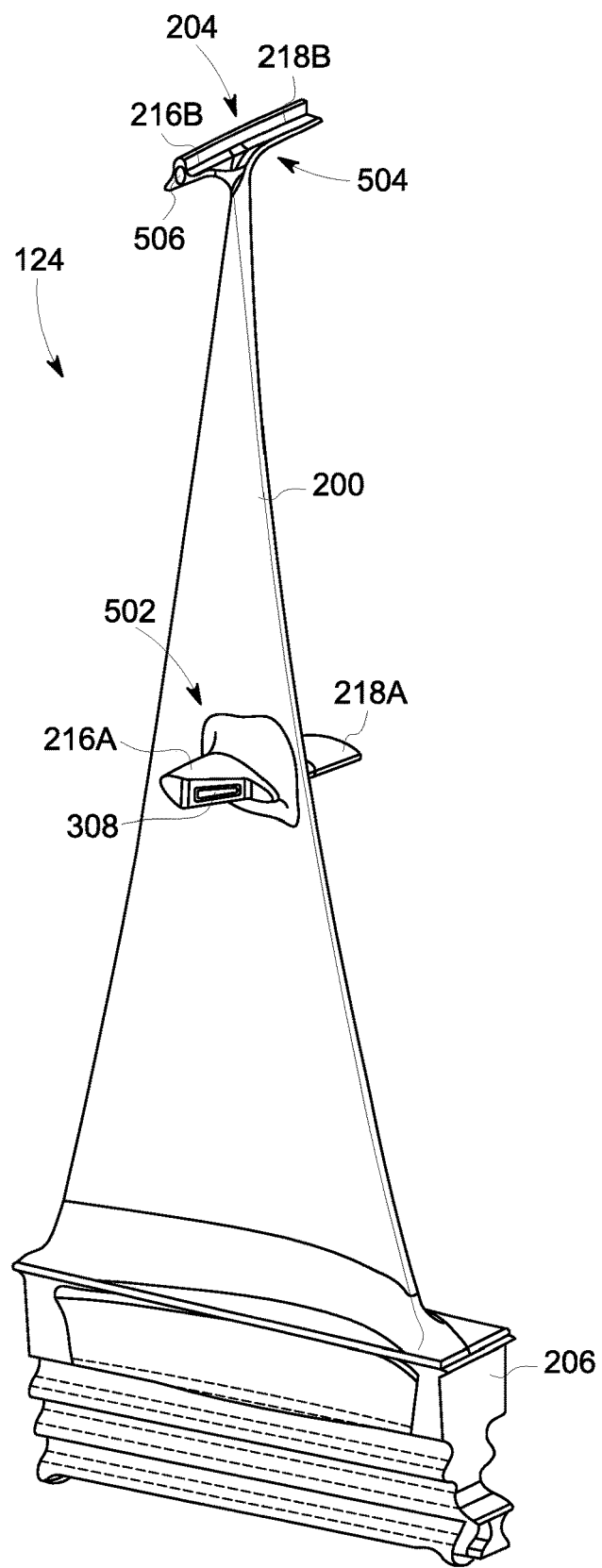
FIG. 13 is a perspective view of a blade of the rotor assembly according to an alternative embodiment.

FIG. 13 is a perspective view of a blade 124 of the rotor assembly 122 (shown in FIG. 2) according to an alternative embodiment. The airfoil 200 of the blade 124 extends from the platform 206 to the distal tip 204. The airfoil 200 includes a first set 502 of mid-span shrouds and a second set 502 of tip shrouds. The tip shrouds include a carrier shroud 216B and a lid shroud 218B, which are located at the distal tip 204. The tip shrouds 216B, 218B may have a similar function as the mid-span shrouds 216A, 216B. For example, the carrier shroud 216B of the second set 504 may carry a damping insert 506 that is free-floating within a cavity of the shroud 216B. The damping insert 506 may be configured to engage the lid shroud 216B of an adjacent blade 124 in the rotor assembly 122 to dampen vibrations of the blades 124. The damping insert 506 may be smaller in size and weight than the damping insert 308 within the carrier shroud 216A of the first set 502 of mid-span shrouds. Although the blade 124 in the illustrated embodiment includes two sets 502, 504 of shrouds that each include associated damping inserts 308, 506 for dissipating vibrations, in other embodiments only one of the sets 502, 504 of shrouds includes a damping insert. For example, the mid-span shrouds of the first set 502 may include the damping insert 308, while the tip shrouds of the second set 504 do not include the damping insert 506. Inversely, the tip shrouds of the second set 504 may include the damping insert 506, while the mid-span shrouds of the first set 502 do not include the damping insert 308. Therefore, the blade 124 may include multiple sets of shrouds, and optionally some of the sets may be conventional shrouds that do not include a damping insert within a pocket of the shroud as described herein.

In an embodiment, a rotor assembly is provided that includes plural blades and damping inserts. The blades are mounted to a rotor disk and spaced apart along an outer periphery of the rotor disk. The blades have airfoils extending from the rotor disk. The blades include a carrier shroud and a lid shroud extending from the respective airfoil in generally opposite directions to respective distal ends. The carrier shrouds define pockets that extend into the carrier shrouds from openings at the distal ends thereof. The distal end of the carrier shroud is disposed at least proximate to the distal end of the lid shroud of a neighboring blade. The damping inserts are disposed in the pockets of the carrier shrouds of the blades and free-floating within the pockets. The damping inserts are configured to dampen vibrations of the blades during rotation of the blades and the rotor disk via engaging an interior surface within the corresponding pocket of the carrier shroud and engaging the distal end of the lid shroud of the neighboring blade. A contact force applied by each damping insert on the distal end of the lid shroud of the neighboring blade is based on a rotational speed of the blades and the rotor disk.

Optionally, the interior surface within the corresponding pocket that is engaged by the damping insert is slanted at an angle towards the opening at the distal end of the corresponding carrier shroud such that the interior surface faces at least partially towards the opening. The contact force applied by each damping insert on the distal end of the lid shroud of the neighboring blade is also based on the angle of the interior surface within the corresponding pocket relative to the opening of the pocket.

Optionally, the damping inserts have an outer surface that engages and moves along the slanted interior surface of the corresponding pocket in a direction from the pocket towards the opening based on the rotational speed of the blades and the rotor disk. The damping inserts are configured to apply the contact force on the lid shroud and a different contact force on the slanted interior surface within the corresponding pocket to dampen vibrations of the blades.

Optionally, the contact force applied by each damping insert on the distal end of the lid shroud of the neighboring blade is proportional to the mass of the respective damping insert.

Optionally, the pockets of the carrier shrouds are shaped to, responsive to the blades and the rotor disk rotating greater than a threshold insert engagement speed, guide the corresponding damping insert therein to move relative to the carrier shroud towards the lid shroud of the neighboring blade from a recessed position that is spaced apart from the lid shroud of the neighboring blade to a contact position abutting the distal end of the lid shroud of the neighboring blade.

Optionally, each damping insert in the corresponding pocket is blocked from exiting the pocket during rotation of the blades and the rotor disk by the distal end of the lid shroud of the neighboring blade.

Optionally, the carrier shroud and the lid shroud of a common blade are mid-span shrouds located in a medial region of the airfoil of the blade along a length of the airfoil.

Optionally, the airfoils of the blades extend from the rotor disk to respective distal tips of the airfoils. The carrier shroud and the lid shroud of a common blade define tip shrouds located at the distal tip of the airfoil.

Optionally, the pockets include an upper interior surface and an opposite lower interior surface within the corresponding pocket. The pocket extends a height between the upper and lower interior surfaces. The upper interior surface within the pocket is angled relative to the lower interior surface such that the height of the pocket decreases with increasing depth from the opening of the pocket into the carrier shroud.

Optionally, the openings of the pockets are defined along corresponding edge surfaces at the distal ends of the carrier shrouds. The damping inserts are elongated along a central axis and held in the corresponding pockets of the carrier shrouds such that the central axis is generally parallel to the edge surface of the corresponding carrier shroud.

Optionally, the damping inserts have a pin-shaped body elongated along a central axis between two ends. The body includes a main portion and two ears. Each ear extends along the central axis from the main portion to a different one of the two ends. The ears both have a respective planar interface surface configured to engage a corresponding shoulder of the carrier shroud within the pocket to prevent the damping insert from rotating 360 degrees about the central axis within the pocket.

Optionally, the distal end of the carrier shroud of one blade is separated from the distal end of the lid shroud of the neighboring blade by a shroud gap when the blades and the rotor disk rotate at an operating speed. At the operating speed, the damping insert disposed in the pocket of the carrier shroud is configured to protrude from the opening of the pocket across the shroud gap to engage the distal end of the lid shroud.

Optionally, the distal end of the carrier shroud of one blade engages the distal end of the lid shroud of the neighboring blade in response to the rotating speed of the blades and the rotor disk surpassing a threshold lock up speed. The damping insert disposed in the pocket of the carrier shroud is configured to protrude from the opening of the pocket to engage the distal end of the lid shroud in response to the rotating speed of the blades and the rotor disk surpassing a threshold insert engagement speed that is lower than the lock up speed.

In another embodiment, a method includes forming a pocket into a carrier shroud of a blade of a rotor assembly. The pocket is formed into the carrier shroud through an opening at a distal end of the carrier shroud relative to the blade. The pocket includes an upper interior surface within the pocket that is slanted towards the opening at the distal end of the carrier shroud. The method also includes inserting a damping insert into the pocket in the carrier shroud through the opening. The damping insert is sized smaller than the pocket and free-floating within the pocket. The damping insert is inserted into the pocket to dampen vibrations of the blade and a neighboring blade of the rotor assembly during rotation of the blades. The damping insert dampens the vibrations via engaging the upper interior surface within the pocket and engaging a distal end of a lid shroud of the neighboring blade that is disposed at least proximate to the distal end of the carrier shroud of the blade. A contact force applied by the damping insert in the pocket on the distal end of the lid shroud of the neighboring blade is based on a rotational speed of the blades.

Optionally, the pocket is formed such that, responsive to the blades rotating greater than a threshold rotational speed, the upper interior surface guides the damping insert to move relative to the carrier shroud towards the lid shroud of the neighboring blade from a recessed position that is spaced apart from the distal end of the lid shroud to a contact position abutting the distal end of the lid shroud.

Optionally, the method also includes mounting the blade to a rotor disk such that the blade extends from an outer periphery of the rotor disk. Subsequent to inserting the damping insert into the pocket in the carrier shroud of the blade, the method also includes mounting the neighboring blade to the rotor disk such that the lid shroud of the neighboring blade blocks the damping insert from exiting the pocket of the blade during rotation of the blades and the rotor disk.

Optionally, the damping insert has a pin-shaped body elongated along a central axis. The damping insert is inserted into the pocket of the carrier shroud such that the central axis is generally parallel to an edge surface at the distal end of the carrier shroud. The opening to the pocket is defined along the edge surface.

In another embodiment, a rotor assembly includes plural blades and damping inserts. The blades are mounted to a rotor disk and spaced apart along an outer periphery of the rotor disk. The blades have airfoils extending from the rotor disk. The blades include a carrier shroud and a lid shroud extending from the respective airfoil in generally opposite directions to respective distal ends. The carrier shrouds define pockets that extend into the carrier shrouds from openings at the distal ends thereof. The pockets include upper interior surfaces that are slanted at an angle towards the opening of the corresponding carrier shroud such that the upper interior surface faces at least partially towards the opening. The distal end of the carrier shroud is disposed at least proximate to the distal end of the lid shroud of a neighboring blade. The damping inserts are disposed in the pockets of the carrier shrouds of the blades and free-floating within the pockets. The damping inserts are configured to engage the upper interior surfaces within the corresponding pockets during rotation of the blades and the rotor disk to dampen vibrations of the blades. The upper interior surfaces within the pockets are slanted to, responsive to the blades and the rotor disk rotating at a rotational speed that exceeds a threshold insert engagement speed, guide the corresponding damping insert therein to move relative to the pocket towards the lid shroud of the neighboring blade from a recessed position that is spaced apart from the lid shroud of the neighboring blade to a contact position abutting the distal end of the lid shroud of the neighboring blade.

Optionally, a contact force applied by each damping insert on the distal end of the lid shroud of the neighboring blade is based on the rotational speed of the blades and the rotor disk and the angle of the upper interior surface.

Optionally, the openings of the pockets are defined along corresponding edge surfaces at the distal ends of the carrier shrouds. The damping inserts are elongated along a central axis and held in the corresponding pockets of the carrier shrouds such that the central axis is generally parallel to the edge surface of the corresponding carrier shroud.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A rotor assembly comprising:
   plural blades mounted to a rotor disk and spaced apart along an outer periphery of the rotor disk, the blades having airfoils extending from the rotor disk, the blades including a carrier shroud and a lid shroud extending from the respective airfoil in generally opposite directions to respective distal ends, the carrier shrouds defining pockets that extend into the carrier shrouds from openings at the distal ends thereof, the distal end of the carrier shroud disposed at least proximate to the distal end of the lid shroud of a neighboring blade; and
   damping inserts disposed in the pockets of the carrier shrouds of the blades and free-floating within the pockets, wherein each of the damping inserts is configured to protrude from the opening of the corresponding pocket across a shroud gap defined between the distal end of the carrier shroud and the distal end of the lid shroud of the neighboring blade to engage the lid shroud of the neighboring blade in response to a rotational speed of the blades and the rotor disk surpassing a threshold insert engagement speed, the damping inserts configured to dampen vibrations of the blades by engaging an interior surface within the corresponding pocket of the carrier shroud and engaging the distal end of the lid shroud of the neighboring blade,
   wherein a contact force applied by each damping insert on the distal end of the lid shroud of the neighboring blade is based on the rotational speed of the blades and the rotor disk, and
   wherein the distal ends of the carrier shrouds are configured to engage the distal ends of the lid shrouds of the corresponding neighboring blades in response to the rotational speed of the blades and the rotor disk surpassing a threshold lock up speed that is greater than the threshold insert engagement speed.

2. The rotor assembly of claim 1, wherein the interior surface within the corresponding pocket that is engaged by the damping insert is slanted at an angle towards the opening at the distal end of the corresponding carrier shroud such that the interior surface faces at least partially towards the opening, wherein the contact force applied by each damping insert on the distal end of the lid shroud of the neighboring blade is also based on the angle of the interior surface within the corresponding pocket relative to the opening of the pocket.

3. The rotor assembly of claim 2, wherein the damping inserts have an outer surface that engages and moves along the slanted interior surface of the corresponding pocket in a direction from the pocket towards the opening based on the rotational speed of the blades and the rotor disk, the damping inserts configured to apply the contact force on the lid shroud and a different contact force on the slanted interior surface within the corresponding pocket to dampen vibrations of the blades.

4. The rotor assembly of claim 1, wherein the contact force applied by each damping insert on the distal end of the lid shroud of the neighboring blade is proportional to the mass of the respective damping insert, wherein the damping inserts are replaceable within the pockets and the mass of the damping inserts is selected to control the contact forces applied by the damping inserts.

5. The rotor assembly of claim 1, wherein the pockets of the carrier shrouds are shaped to, responsive to the blades and the rotor disk rotating greater than the threshold insert engagement speed, guide the corresponding damping insert therein to move relative to the carrier shroud towards the lid shroud of the neighboring blade from a recessed position that is spaced apart from the lid shroud of the neighboring blade to a contact position abutting the distal end of the lid shroud of the neighboring blade.

6. The rotor assembly of claim 1, wherein each damping insert in the corresponding pocket is blocked from exiting the pocket during rotation of the blades and the rotor disk by the distal end of the lid shroud of the neighboring blade.

7. The rotor assembly of claim 1, wherein the carrier shroud and the lid shroud of a common blade are mid-span shrouds located in a medial region of the airfoil of the blade along a length of the airfoil.

8. The rotor assembly of claim 1, wherein the airfoils of the blades extend from the rotor disk to respective distal tips of the airfoils, the carrier shroud and the lid shroud of a common blade defining tip shrouds located at the distal tip of the airfoil.

9. The rotor assembly of claim 1, wherein the pockets include an upper interior surface and an opposite lower interior surface within the corresponding pocket, the pocket extending a height between the upper and lower interior surfaces, the upper interior surface within the pocket angled relative to the lower interior surface such that the height of the pocket decreases with increasing depth from the opening of the pocket into the carrier shroud.

10. The rotor assembly of claim 1, wherein the openings of the pockets are defined along corresponding edge surfaces at the distal ends of the carrier shrouds, the damping inserts being elongated along a central axis and held in the corresponding pockets of the carrier shrouds such that the central axis is generally parallel to the edge surface of the corresponding carrier shroud.

11. The rotor assembly of claim 1, wherein the damping inserts have a pin-shaped body elongated along a central axis between two ends, the body including a main portion and two ears, each ear extending along the central axis from the main portion to a different one of the two ends, the ears both having a respective planar interface surface configured to engage a corresponding shoulder of the carrier shroud within the pocket to prevent the damping insert from rotating 360 degrees about the central axis within the pocket.

12. The rotor assembly of claim 1, wherein the distal end of the carrier shroud of each blade is separated from the distal end of the lid shroud of the neighboring blade by the shroud gap when the rotational speed of the blades and the rotor disk is less than the threshold lock up speed.

13. The rotor assembly of claim 1, wherein there is no shroud gap defined between the distal end of the carrier shroud and the distal end of the lid shroud of the neighboring blade when the rotational speed is above the threshold lock up speed.

14. A method comprising:
forming a pocket into a carrier shroud of a blade of a rotor assembly, the pocket formed into the carrier shroud through an opening at a distal end of the carrier shroud relative to the blade, the pocket including an upper interior surface within the pocket that is slanted towards the opening at the distal end of the carrier shroud;
mounting the blade to a rotor disk such that the blade extends from an outer periphery of the rotor disk;
inserting a damping insert into the pocket in the carrier shroud through the opening, the damping insert sized smaller than the pocket and free-floating within the pocket; and
mounting a neighboring blade to the rotor disk, the neighboring blade including a lid shroud,
wherein the damping insert is inserted into the pocket such that the damping insert is configured to protrude from the opening of the pocket across a shroud gap defined between the distal end of the carrier shroud and a distal end of the lid shroud of the neighboring blade to engage the lid shroud of the neighboring blade in response to a rotational speed of the blades surpassing a threshold insert engagement speed, the damping insert configured to dampen vibrations of the blade and a neighboring blade by engaging the upper interior surface within the pocket and engaging the lid shroud of the neighboring blade, wherein a contact force applied by the damping insert in the pocket on the distal end of the lid shroud of the neighboring blade is based on the rotational speed of the blades, and
wherein the blade and the neighboring blade are mounted to the rotor disk such that the distal end of the carrier shroud is configured to engage the distal end of the lid shroud of the neighboring blade in response to the rotational speed of the blades surpassing a threshold lock up speed that is greater than the threshold insert engagement speed.

15. The method of claim 14, wherein the pocket is formed such that, responsive to the blades rotating greater than the threshold insert engagement speed, the upper interior surface guides the damping insert to move relative to the carrier shroud towards the lid shroud of the neighboring blade from a recessed position that is spaced apart from the distal end of the lid shroud to a contact position abutting the distal end of the lid shroud.

16. The method of claim 14, wherein the lid shroud of the neighboring blade blocks the damping insert from exiting the pocket of the blade during rotation of the blades and the rotor disk.

17. The method of claim 14, wherein the damping insert has a pin-shaped body elongated along a central axis, wherein the damping insert is inserted into the pocket of the carrier shroud such that the central axis is generally parallel to an edge surface at the distal end of the carrier shroud, the opening to the pocket defined along the edge surface.

18. A rotor assembly comprising:
plural blades mounted to a rotor disk and spaced apart along an outer periphery of the rotor disk, the blades having airfoils extending from the rotor disk, the blades including a carrier shroud and a lid shroud extending from the respective airfoil in generally opposite directions to respective distal ends, the carrier shrouds defining pockets that extend into the carrier shrouds from openings at the distal ends thereof, the pockets including upper interior surfaces that are slanted at an angle towards the opening of the corresponding carrier shroud such that the upper interior surface faces at least partially towards the opening, the distal end of the carrier shroud disposed at least proximate to the distal end of the lid shroud of a neighboring blade; and
damping inserts disposed in the pockets of the carrier shrouds of the blades and free-floating within the pockets, the damping inserts configured to engage the upper interior surfaces within the corresponding pockets during rotation of the blades and the rotor disk to dampen vibrations of the blades,
wherein the upper interior surfaces within the pockets are slanted to, responsive to the blades and the rotor disk rotating at a rotational speed that exceeds a threshold insert engagement speed, guide the corresponding damping inserts therein to move relative to the pocket towards the lid shroud of the neighboring blade from a recessed position that is spaced apart from the lid shroud of the neighboring blade across a shroud gap defined between the distal end of the carrier shroud and the distal end of the lid shroud of the neighboring blade to a contact position abutting the distal end of the lid shroud of the neighboring blade, and
wherein the distal ends of the carrier shrouds are configured to engage the distal ends of the lid shrouds of the corresponding neighboring blades in response to the rotational speed of the blades and the rotor disk surpassing a threshold lock up speed that is greater than the threshold insert engagement speed.

19. The rotor assembly of claim 18, wherein a contact force applied by each damping insert on the distal end of the lid shroud of the neighboring blade is based on the rotational speed of the blades and the rotor disk and the angle of the upper interior surface, wherein the angle of the upper interior surface is selected to control the contact forces applied by the damping inserts at different specific rotational speeds of the blades and the rotor disk.

20. The rotor assembly of claim 18, wherein the openings of the pockets are defined along corresponding edge surfaces at the distal ends of the carrier shrouds, the damping inserts being elongated along a central axis and held in the corresponding pockets of the carrier shrouds such that the central axis is generally parallel to the edge surface of the corresponding carrier shroud.

* * * * *